(12) United States Patent
Kim

(10) Patent No.: US 10,822,036 B2
(45) Date of Patent: Nov. 3, 2020

(54) VEHICLE UNDERBODY STRUCTURE

(71) Applicants: Hyundai Motor Company, Seoul (KR); Kia Motors Corporation, Seoul (KR)

(72) Inventor: Do Hoi Kim, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 35 days.

(21) Appl. No.: 16/177,852

(22) Filed: Nov. 1, 2018

(65) Prior Publication Data

US 2020/0079428 A1  Mar. 12, 2020

(30) Foreign Application Priority Data

Sep. 6, 2018 (KR) ........................ 10-2018-0106365

(51) Int. Cl.
| | |
|---|---|
| *B62D 21/03* | (2006.01) |
| *B62D 25/02* | (2006.01) |
| *B62D 27/02* | (2006.01) |
| *B62D 21/15* | (2006.01) |
| *B62D 25/04* | (2006.01) |
| *B62D 25/20* | (2006.01) |
| *B60N 2/005* | (2006.01) |

(52) U.S. Cl.
CPC .......... *B62D 21/03* (2013.01); *B62D 21/157* (2013.01); *B62D 25/025* (2013.01); *B62D 25/04* (2013.01); *B62D 25/20* (2013.01); *B62D 27/02* (2013.01); *B60N 2/005* (2013.01)

(58) Field of Classification Search
CPC .... B62D 21/03; B62D 21/157; B62D 25/025; B62D 25/04; B62D 25/20; B62D 27/02
USPC ......... 296/187.08, 193.07, 203.01, 204, 209, 296/193.06
See application file for complete search history.

(56) References Cited

U.S. PATENT DOCUMENTS

| | | | | |
|---|---|---|---|---|
| 5,829,219 A | * | 11/1998 | Sugawara ............ | B62D 23/005 52/653.2 |
| 6,129,412 A | * | 10/2000 | Tanuma ............... | B62D 21/157 296/204 |
| 8,567,857 B2 | * | 10/2013 | Fujii ..................... | B60R 22/023 296/193.05 |
| 2012/0212009 A1 | * | 8/2012 | Ishizono .............. | B62D 25/025 296/193.07 |
| 2014/0159427 A1 | | 6/2014 | Kim et al. | |
| 2016/0052561 A1 | * | 2/2016 | Atsumi ............. | B62D 25/2045 296/187.08 |

FOREIGN PATENT DOCUMENTS

KR     20140075482 A     6/2014

* cited by examiner

*Primary Examiner* — Joseph D. Pape
(74) *Attorney, Agent, or Firm* — Slater Matsil, LLP

(57) ABSTRACT

A vehicle underbody structure includes a side sill protruding upward at its center to be coupled to a lower end of each center pillar, a cross member, an associated end of which is coupled to the side sill on a floor panel, and a seat mounting member installed to surround the end of the cross member to support a seat.

20 Claims, 8 Drawing Sheets

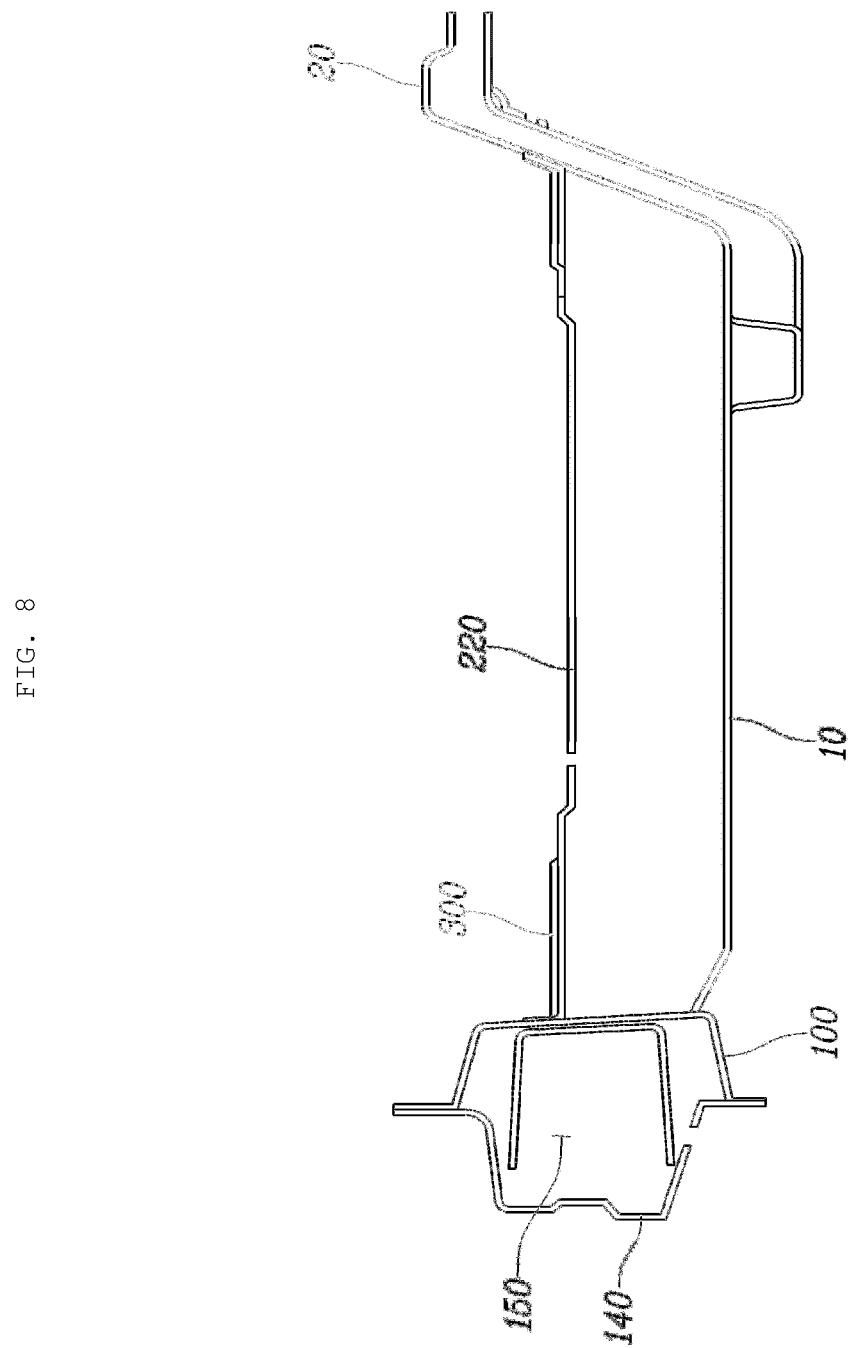

VEHICLE UNDERBODY STRUCTURE

CROSS-REFERENCE TO RELATED APPLICATIONS

This application claims priority to Korean Patent Application No. 10-2018-0106365, filed on Sep. 6, 2018, which application is hereby incorporated herein by reference.

TECHNICAL FIELD

The present invention relates to a vehicle underbody structure.

BACKGROUND

In general, the underbody structure of a passenger vehicle includes two pairs of cross members installed to traverse the central tunnel thereof, side sills installed at the ends of the cross members, and center pillars installed at the upper ends of the side sills.

However, this structure brings about an increase in weight and cost due to an excessive number of parts and multiple reinforcing members or the like have to be installed to obtain sufficient strength.

Therefore, there is a need for a new vehicle underbody structure having the same or higher strength compared to the related art while achieving its weight-lightening by reducing the number of parts.

The foregoing is intended merely to aid in the understanding of the background of the present invention, and is not intended to mean that the present invention falls within the purview of the related art that is already known to those skilled in the art.

SUMMARY

The present invention relates to a vehicle underbody structure. Particular embodiments relate to a vehicle underbody structure that includes a floor, side sills, and center pillars of a vehicle.

Accordingly, embodiments of the present invention can help solve problems occurring in the related art. For example, embodiments of and the present invention propose a vehicle underbody structure capable of having reduced weight and high strength by achieving simplification compared to the related art.

In accordance with an aspect of the present invention, a vehicle underbody structure includes a side sill protruding upward at its center to be coupled to a lower end of each center pillar, a cross member, an associated end of which is coupled to the side sill on a floor panel, and a seat mounting member installed to surround the end of the cross member to support a seat.

The side sill may be divided into a base region to form a bulkhead attenuating an impulse in the event of side collision of a vehicle, a connection region protruding upward from the base region for connection with the lower end of the center pillar, and a curved region formed at a boundary between the base region and the connection region. The curved region may allow an upper surface of the base region and a side surface of the connection region to be interconnected in a curved form.

The connection region may be coupled to the center pillar over the bulkhead.

The base region may be coupled to an outer member to form the bulkhead, and the outer member may be installed outward of the vehicle with respect to the side sill.

The cross member may be increased in width toward the end thereof.

The cross member may be a single cross member installed on the floor panel.

The seat mounting member may extend in a forward and rearward direction of a vehicle along the side sill at the end of the cross member, and a reinforcing member may be installed at a portion in which the seat mounting member is coupled to the seat.

The reinforcing member may consist of two reinforcing members installed one by one to the seat mounting member in forward and rearward directions of the vehicle.

The vehicle underbody structure according to embodiments of the present invention can have the following effects. Firstly, it is possible to achieve a reduction in weight by reducing the number of parts. Secondly, it is possible to reduce an amount of deformation by improving the connection of the load path between the side sill and the center pillar.

BRIEF DESCRIPTION OF THE DRAWINGS

The above and other objects, features and advantages of the present invention will be more clearly understood from the following detailed description taken in conjunction with the accompanying drawings, in which:

FIG. 8 is a cross-sectional view taken along line C-C' of FIG. 5.

DETAILED DESCRIPTION OF ILLUSTRATIVE EMBODIMENTS

The terminology used in the present disclosure is for the purpose of describing particular embodiments only and is not intended to limit the disclosure. As used in the disclosure and the appended claims, the singular forms "a", "an" and "the" are intended to include the plural forms as well, unless context clearly indicates otherwise. It will be further understood that the terms "comprises/includes" and/or "comprising/including" when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

A vehicle underbody structure according to the preferred embodiments of the present invention will be described below with reference to the accompanying drawings.

Figure 1:
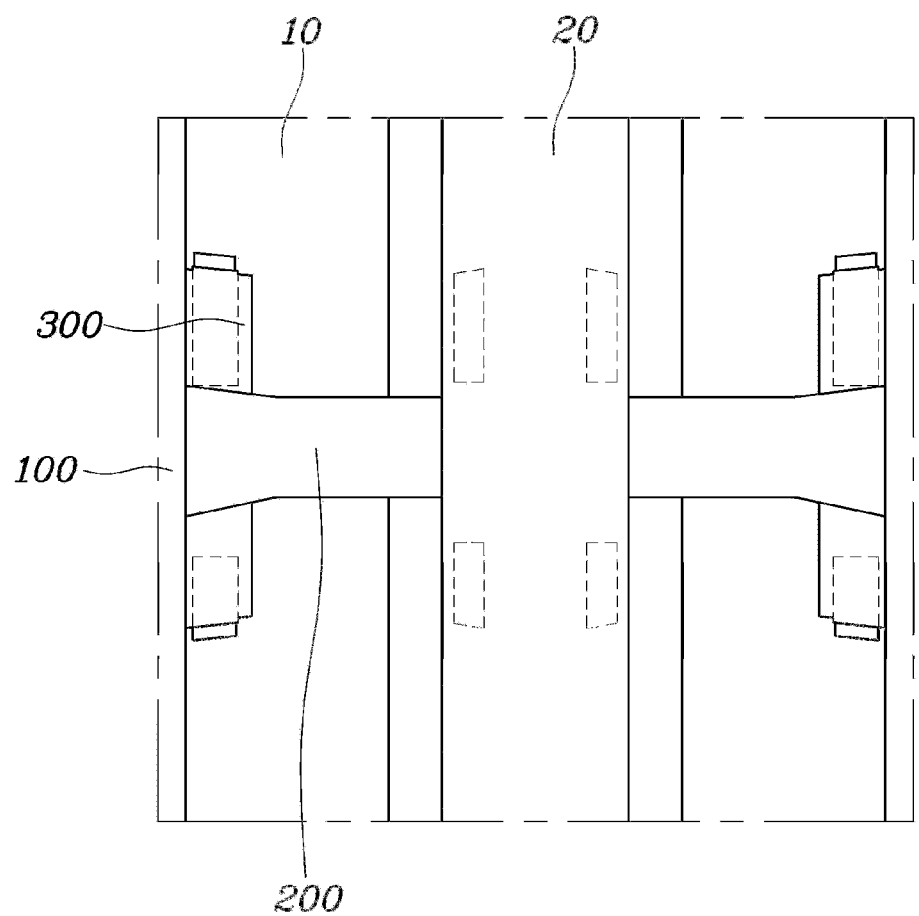
FIG. 1 is a top view illustrating a vehicle underbody structure according to an embodiment of the present invention.
Figure 2:
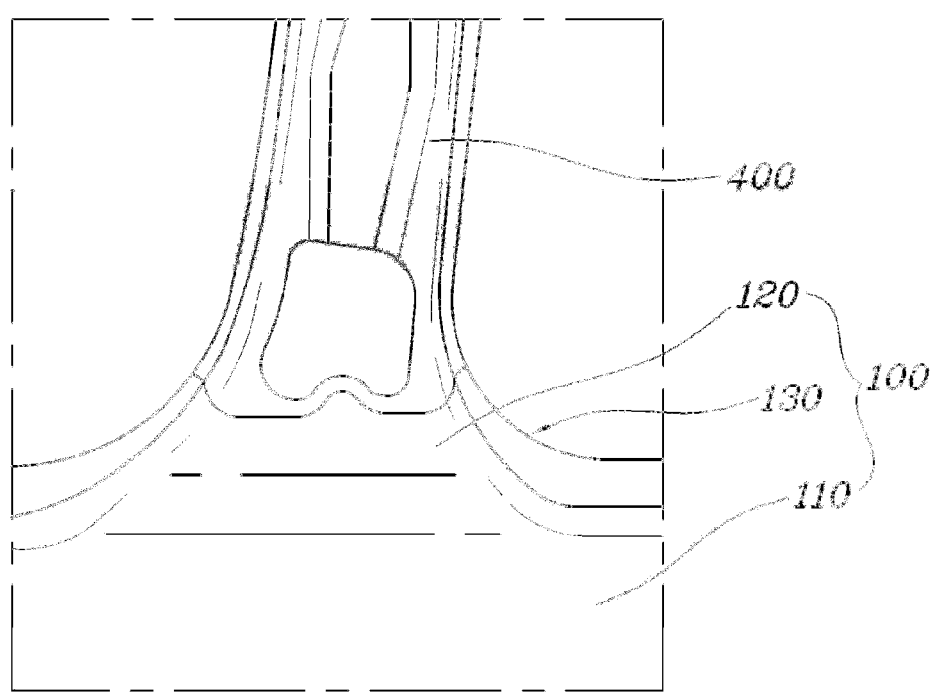
FIG. 2 is a view illustrating the coupling between one side sill and one center pillar.
Figure 3:
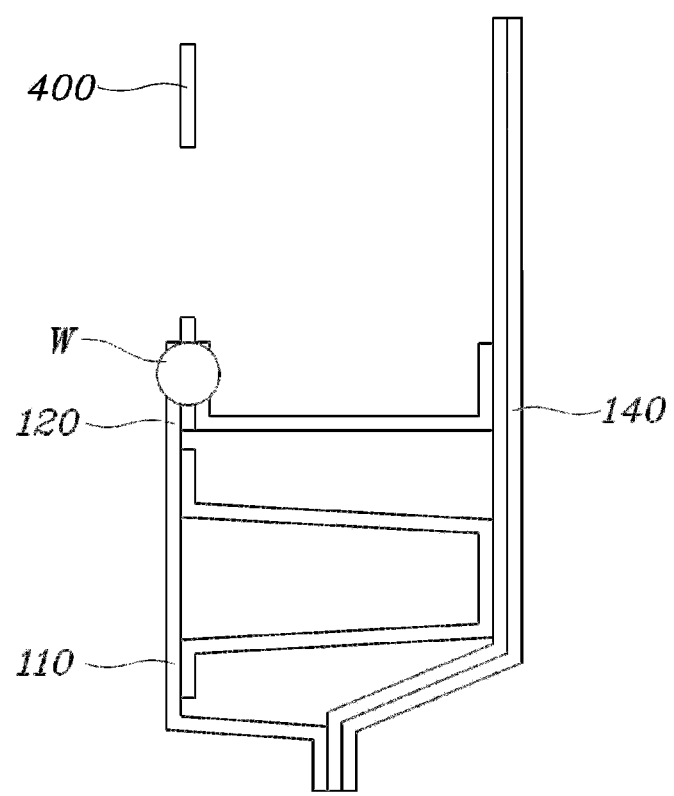
FIG. 3 is a cross-sectional view illustrating the coupling between the side sill and the center pillar.
Figure 4:
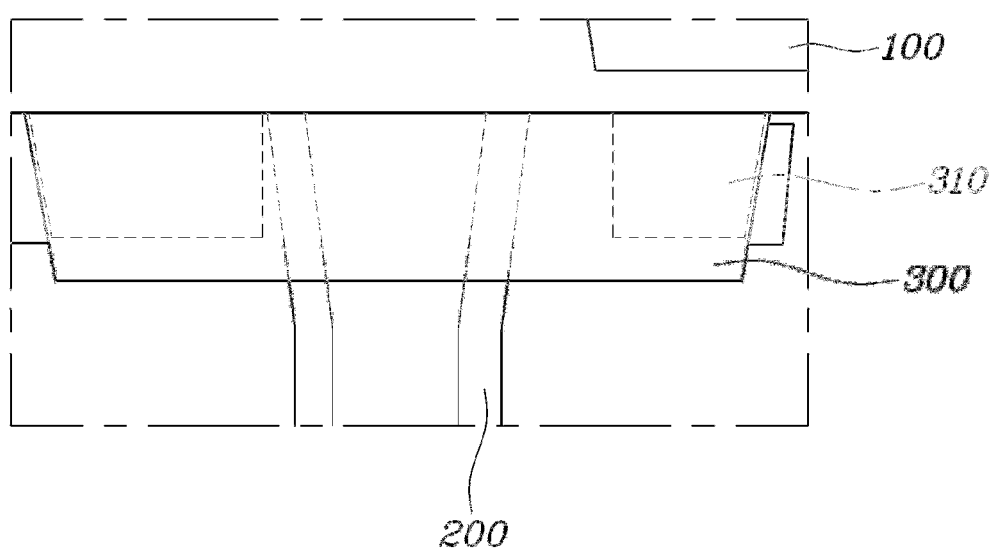
FIG. 4 is a view illustrating the coupling between the side sill and a cross member.
Figure 5:
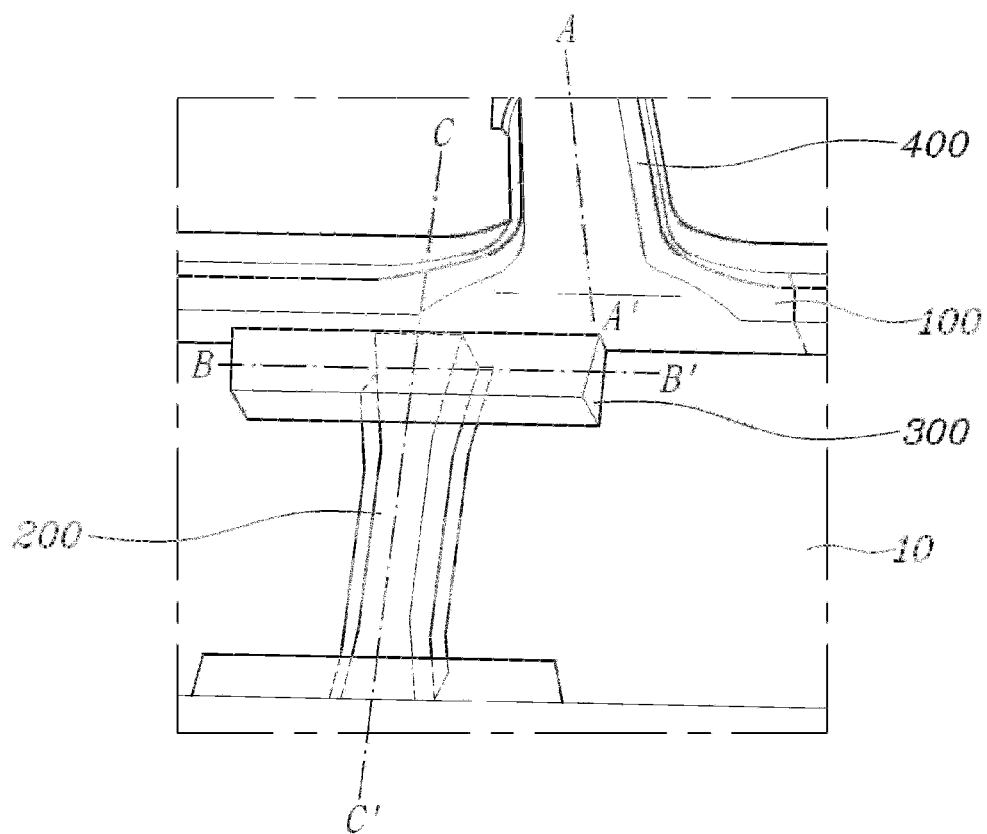
FIG. 5 is a perspective view illustrating the coupling between the side sill, the cross member, and the center pillar.
Figure 6:
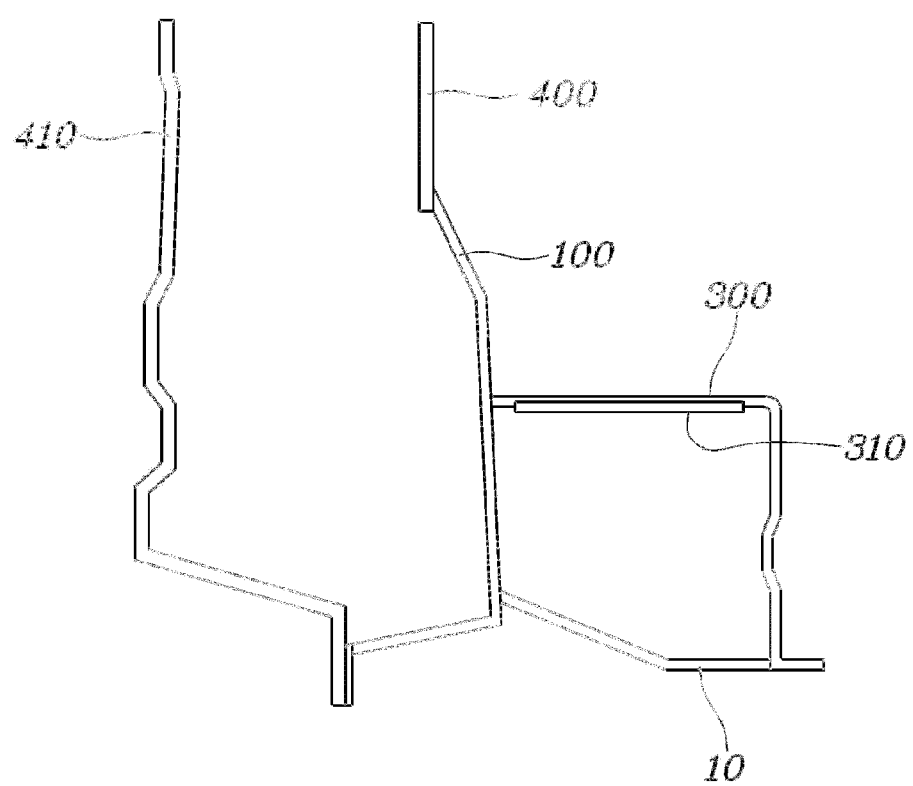
FIG. 6 is a cross-sectional view taken along line A-A' of FIG. 5.
Figure 7:
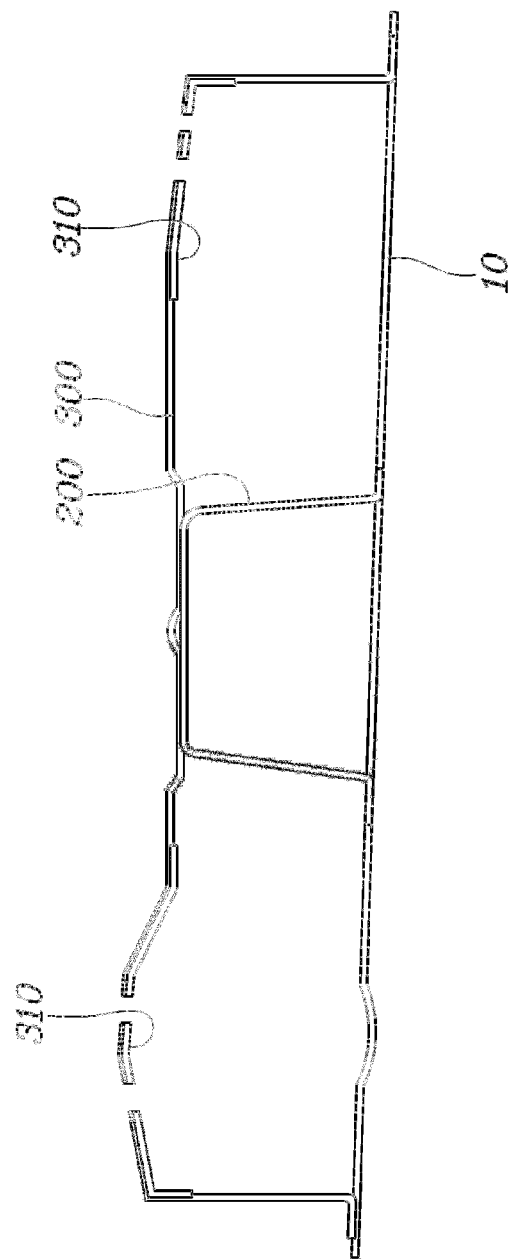
FIG. 7 is a cross-sectional view taken along line B-B' of FIG. 5.

FIG. 1 is a top view illustrating a vehicle underbody structure according to an embodiment of the present invention. FIG. 2 is a view illustrating the coupling between one side sill and one center pillar. FIG. 3 is a cross-sectional view illustrating the coupling between the side sill and the center pillar. FIG. 4 is a view illustrating the coupling between the side sill and a cross member. FIG. 5 is a perspective view illustrating the coupling between the side sill, the cross member, and the center pillar. FIG. 6 is a cross-sectional view taken along line A-A' of FIG. 5. FIG. 7 is a cross-sectional view taken along line B-B' of FIG. 5. FIG. 8 is a cross-sectional view taken along line C-C' of FIG. 5.

As illustrated in FIGS. 1 to 8, the vehicle underbody structure according to embodiments of the present invention includes a side sill 100 that protrudes upward at the center thereof to be coupled to the lower end of each center pillar 400, a cross member 200, an associated end of which is coupled to the side sill 100 on a floor panel 10, and a seat mounting member 300 that is installed to surround the end of the cross member 200 to support a seat (not shown).

In the related art, the upper surfaces of side sills are arranged in parallel with each other, and the uppers end of each of the side sills extends to the lower surface of an associated center pillar or overlaps with the center pillar at the outside of the vehicle. Hence, this causes the breakage of the vehicle because a load path is not properly connected between the center pillar and the side sill or causes an increase in weight because an overlapped portion is increased.

Accordingly, the vehicle underbody structure according to an embodiment of the present invention is configured such that the side sill 100 has a protruding portion formed on the upper surface thereof, and the lower end of the center pillar 400 is coupled to the protruding portion to form a continuous load path between the side sill 100 and the center pillar 400, thereby enabling a larger survival space for passengers to be secured while minimizing the rolling of the vehicle in the event of side collision.

In the related art, cross members are respectively installed to the front and rear sides of the vehicle and a seat is directly supported by these cross members. However, an embodiment of the present invention differs from the related art in that only a single cross member 200 is installed and a separate seat mounting member 300 is installed to support a seat.

Especially, the end of the cross member 200, namely the portion of the cross member 200 coupled to the side sill 100 has a horn shape such that its cross-sectional area is increased, which can prevent the breakage of the vehicle by resolving a concentration of load applied between the cross member 200 and the side sill 100 in the event of side collision and can secure a larger survival space for passengers by distributing the load and minimizing the rolling of the vehicle through a load path formed between the cross member 200 and the side sill 100.

The seat mounting member 300 is installed to surround the end of the cross member 200, namely the portion of the cross member 200 coupled to the side sill 100, and extends in parallel with the side sill 100 in the forward and rearward direction of the vehicle. The seat is installed on the seat mounting member 300.

Preferably, the side sill 100 is largely divided into a base region 110, a connection region 120, and a curved region 130. The base region 110 is a region similar to a conventional side sill, and an outer member 140 and a bulkhead 150 are formed in the base region 110. The connection region 120 is a region that protrudes upward from the base region 110 for connection with the lower end of the center pillar 400. The curved region 130 is provided to connect the upper surface of the base region 110 and the side surface of the connection region 120 in a rounded form.

In the case where the boundary of two components, such as the side sill 100 and the center pillar 400 which vertically are interconnected, is curved when they are interconnected, the vehicle underbody structure can have higher strength compared to when they are interconnected in a rectilinear form. Thus, the curved region 130 is provided such that the connection region 120 protruding upward from the base region 110 of the side sill 100 is rounded instead of vertical connection.

In particular, the center pillar 400 is preferably coupled to the connection region 120 over the bulkhead 150. In the related art, the lower end of a center pillar further extends from a connection region to be connected to a base region. However, no bent portion is formed since the connection region 120 is in parallel with the lower end of the center pillar 400 in the present invention. Therefore, it is unnecessary to further extend the lower end of the center pillar 400 for reinforcement. In addition, it is possible to further enhance the strength of the vehicle in the event of side collision since a center pillar outer member 410 is installed on the outer surface of the center pillar 400 to define a space such as a type of bulkhead.

A separate reinforcing member 310 may be installed at a seat installation position of the seat mounting member 300. This reinforcing member 310 may consist of two reinforcing members installed one by one in the forward and rearward directions of the vehicle to support the respective front and rear portions of the seat.

While the specific embodiments have been described with reference to the drawings, the present invention is not limited thereto. It will be apparent to those skilled in the art that various changes and modifications may be made without departing from the spirit and scope of the disclosure as defined in the following claims.

Therefore, the embodiments described above are only to exemplify the present invention but not to limit the scope of the present invention. The scope of the present invention is defined by the appended claims, and it should be construed that all modifications or variations derived from the meaning, scope, and equivalent concept of the claims fall within the scope of the invention.

What is claimed is:

1. A vehicle underbody structure for a vehicle, the vehicle underbody structure comprising:
    a side sill protruding upward at a center so as to be coupled to a lower end of a center pillar;
    a cross member, an end of the cross member being coupled to the side sill on a floor panel; and
    a seat mounting member installed to surround the end of the cross member to support a seat,
    wherein the cross member is a single cross member installed on the floor panel, the vehicle underbody structure having no other cross members other than the single cross member, wherein the seat mounting member extends at a predetermined length in a forward and rearward direction of the vehicle along the side sill at the end of the cross member; and wherein the seat mounting member has reinforcing portions coupled to the seat at front and rear ends thereof, respectively.

2. The vehicle underbody structure according to claim 1, wherein the side sill is divided into a base region to form a bulkhead, a connection region protruding upward from the base region for connection with the lower end of the center pillar, and a curved region formed at a boundary between the base region and the connection region.

3. The vehicle underbody structure according to claim 2, wherein the bulkhead is configured to attenuate an impulse in the event of side collision of the vehicle.

4. The vehicle underbody structure according to claim 2, wherein the curved region allows an upper surface of the base region and a side surface of the connection region to be interconnected in a curved form.

5. The vehicle underbody structure according to claim 4, wherein the connection region is coupled to the center pillar over the bulkhead.

6. The vehicle underbody structure according to claim 4, wherein:
the base region is coupled to an outer member to form the bulkhead; and
the outer member is installed outward of the vehicle with respect to the side sill.

7. The vehicle underbody structure according to claim 1, wherein the cross member is increased in width toward the end of the cross member.

8. The vehicle underbody structure according to claim 1, wherein:
a reinforcing member is installed at the two reinforcing portions, respectively, in which the seat mounting member is coupled to the seat.

9. The vehicle underbody structure according to claim 8, wherein each of the reinforcing members is installed to the seat mounting member in forward and rearward directions of the vehicle with respect to the cross member.

10. A vehicle comprising:
a floor panel;
a center pillar;
a side sill protruding upward at its center, the side sill coupled to a lower end of the center pillar;
a cross member, an end of the cross member being coupled to the side sill on the floor panel;
a seat overlying the floor panel; and
a seat mounting member installed to surround the end of the cross member to support the seat,
wherein the cross member is a single cross member installed on the floor panel, the vehicle having no other cross members other than the single cross member installed on the floor panel,
wherein the seat mounting member extends at a predetermined length in a forward and rearward direction of the vehicle along the side sill at the end of the cross member; and
wherein the seat mounting member has reinforcing portions coupled to the seat at front and rear ends thereof, respectively.

11. The vehicle according to claim 10, wherein the side sill is divided into a base region to form a bulkhead, a connection region protruding upward from the base region for connection with the lower end of the center pillar, and a curved region formed at a boundary between the base region and the connection region.

12. The vehicle according to claim 11, wherein the bulkhead is configured to attenuate an impulse in the event of side collision of the vehicle.

13. The vehicle according to claim 11, wherein the curved region allows an upper surface of the base region and a side surface of the connection region to be interconnected in a curved form.

14. The vehicle according to claim 13, wherein the connection region is coupled to the center pillar over the bulkhead.

15. The vehicle according to claim 13, wherein:
the base region is coupled to an outer member to form the bulkhead; and
the outer member is installed outward of the vehicle with respect to the side sill.

16. The vehicle according to claim 10, wherein the cross member is increased in width toward the end of the cross member.

17. The vehicle according to claim 10, wherein:
a reinforcing member is installed at the two reinforcing portions, respectively, in which the seat mounting member is coupled to the seat.

18. The vehicle according to claim 17, wherein each of the reinforcing members is installed to the seat mounting member in forward and rearward directions of the vehicle with respect to the cross member.

19. A vehicle underbody structure for a vehicle, the vehicle underbody structure comprising:
a side sill protruding upward at a center so as to be coupled to a lower end of a center pillar, wherein the side sill is divided into a base region to form a bulkhead, a connection region protruding upward from the base region and coupled with the lower end of the center pillar over the bulkhead, and a curved region formed at a boundary between the base region and the connection region so that an upper surface of the base region and a side surface of the connection region are interconnected in a curved form;
a single cross member on a floor panel such that an end of the cross member is coupled to the side sill on the floor panel, the vehicle underbody structure having no other cross members other than the single cross member, wherein the cross member is increased in width toward the end of the cross member;
a reinforcing member; and
a seat mounting member installed to surround the end of the cross member to support a seat, wherein the seat mounting member extends at a predetermined length in a forward and rearward direction of the vehicle along the side sill at the end of the cross member and wherein the seat mounting member has reinforcing portions installed at the reinforcing member and to be coupled to a seat at front and rear ends thereof, respectively, wherein each of the reinforcing members is installed to the seat mounting member in forward and rearward directions of the vehicle with respect to the cross member.

20. The vehicle underbody structure according to claim 19, wherein:
the base region is coupled to an outer member to form the bulkhead; and the outer member is installed outward of the vehicle with respect to the side sill.

* * * * *